(12) United States Patent
Singhal

(10) Patent No.: US 12,141,161 B1
(45) Date of Patent: Nov. 12, 2024

(54) AUTOMATED NON-RELATIONAL TO RELATIONAL DATABASE STREAMING

(71) Applicant: Amazon Technologies, Inc., Seattle, WA (US)

(72) Inventor: Prateek Singhal, Burnaby (CA)

(73) Assignee: Amazon Technologies, Inc., Seattle, WA (US)

( * ) Notice: Subject to any disclaimer, the term of this patent is extended or adjusted under 35 U.S.C. 154(b) by 47 days.

(21) Appl. No.: 17/808,243

(22) Filed: Jun. 22, 2022

(51) Int. Cl.
*G06F 16/25* (2019.01)
*G06F 16/21* (2019.01)
*G06F 16/28* (2019.01)

(52) U.S. Cl.
CPC .......... *G06F 16/258* (2019.01); *G06F 16/211* (2019.01); *G06F 16/252* (2019.01); *G06F 16/284* (2019.01)

(58) Field of Classification Search
CPC .... G06F 16/252; G06F 16/211; G06F 16/284; G06F 16/258
See application file for complete search history.

(56) References Cited

U.S. PATENT DOCUMENTS

| | | | |
|---|---|---|---|
| 10,387,388 B2 | 8/2019 | Doan et al. | |
| 11,138,194 B2 | 10/2021 | Yan et al. | |
| 11,200,232 B2 | 12/2021 | Taylor | |
| 2007/0226196 A1* | 9/2007 | Adya | G06F 16/24539 |
| 2009/0193039 A1* | 7/2009 | Bradley | G06F 16/2465 |
| 2017/0337248 A1* | 11/2017 | Blaaberg | G06F 16/20 |

OTHER PUBLICATIONS

Utilities Guide: "Oracle® Health Sciences InForm 6.0.1.2", (Part No. E84505-01, Copyright © 2012, 2017, Oracle®, "hereafter OracleInForm" (Year: 2017).*

* cited by examiner

*Primary Examiner* — Kuen S Lu
(74) *Attorney, Agent, or Firm* — S. Scott Foster; Kowert, Hood, Munyon, Rankin & Goetzel, P.C.

(57) ABSTRACT

A data stream conversion service may crawl a non-relational database to determined database attributes that characterize the data structure of the non-relational database. The data stream conversion service may evaluate the one or more attributes of the non-relational database to generate a schema for a relational database, wherein the schema maps the non-relational database attributes to respective fields of a relational database. The data stream conversion service may generate a relational database using the determined schema and replicate a data stream for the non-relational database to the relational database.

20 Claims, 11 Drawing Sheets

AUTOMATED NON-RELATIONAL TO RELATIONAL DATABASE STREAMING

BACKGROUND

Different types of databases offer different features. These different features may allow the systems, services, or applications to use the optimal type of database. For example, non-relational databases are databases that organize data in a schema-free or schema-on-read format, which may be beneficial for some systems, services, or applications with changing data schemas. In another example, relational databases may organize data into a defined schema with one or more tables of columns and rows, with unique keys identifying each row, which may be beneficial for some systems, services, or applications that utilize static data schemas.

Figure 1A:
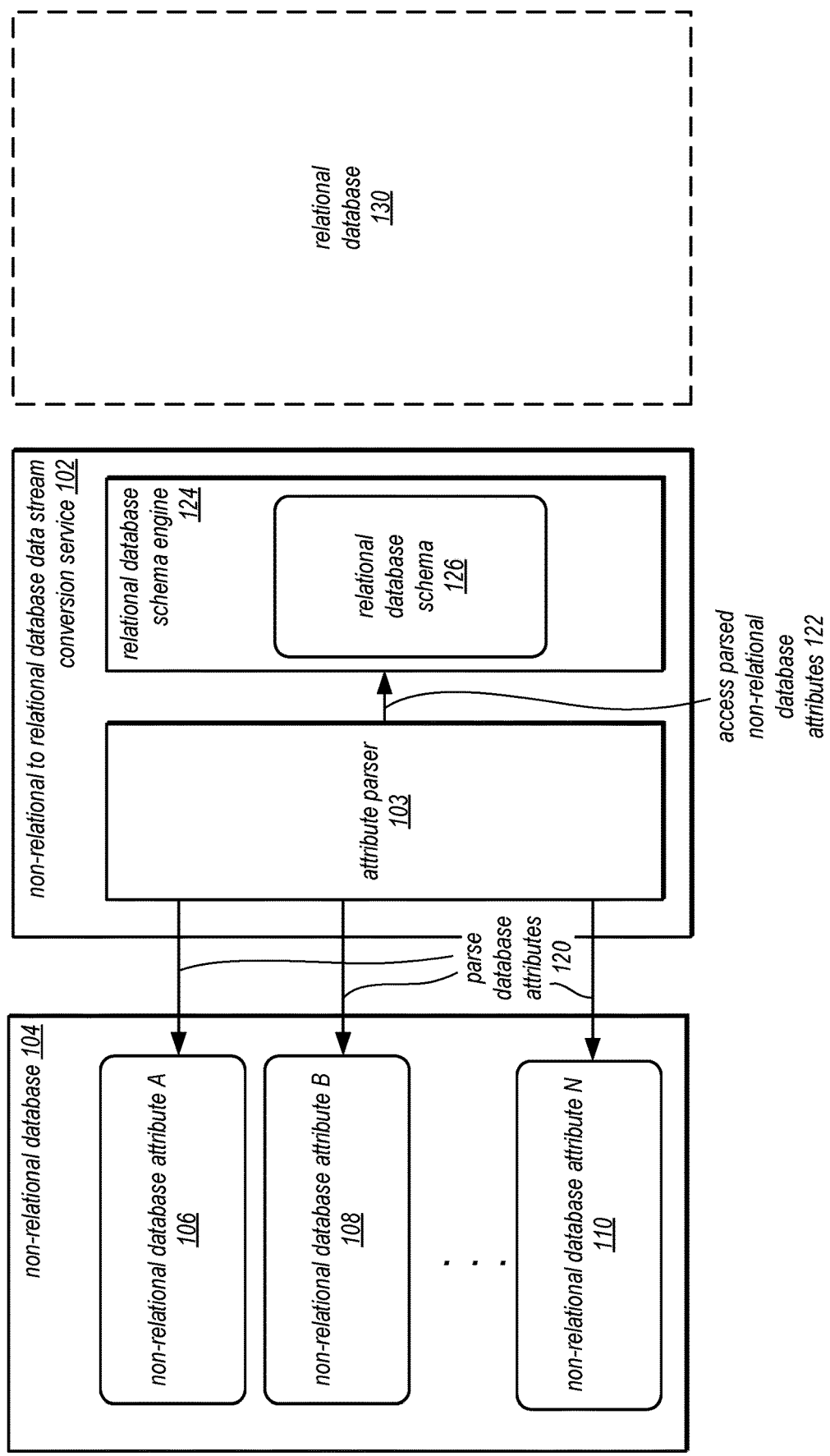
FIG. 1A illustrates a logical block diagram illustrating a non-relational to relational database data stream conversion service that parses database attributes of the non-relational database to generate a relational database schema, according to some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques of enabling data streaming from a non-relational database to a relational database are described herein. Non-relational databases provide advantages ranging from enabling the database to store and process large amounts of unstructured data-due at least in part to a lack of a predefined schema for the database. The lack of a schema enables non-relational database to process various type of data without the need to modify its architecture. Non-relational databases provide a flexible data model with the ability to easily store and combine data of any structure without the need to modify a schema.

While non-relational databases may often be optimized for writing and reading single individual records (e.g., at high throughput), they may not be designed for complex querying and scanning of entire database tables. For data analytics use-cases that often requires joining multiple tables and complex querying involving scanning of large number of records, or transaction processing that updates multiple data records in one transaction (e.g., as part of a financial transaction) relational databases may be optimal. In various embodiments, relational databases organize data into a set schema with one or more tables (or other relations) often with columns and rows, with unique keys identifying each row and provides indexing capabilities that enable faster query response times. Relational databases may be used as Online Transactions Processing ("OLTP") data stores for data processing and storage of applications that operate at large scale and enable real-time execution of large numbers of database transactions by large numbers of client applications or may provide Online Analytic Processing ("OLAP") style data stores, which may facilitate analysis of large quantities of data. In some scenarios, relational databases furthermore enable complex Structured Query Language ("SQL") queries for data analysis and reporting.

Given the different strengths of non-relational and relational databases, scenarios may occur when data originally stored in a non-relational database may be useful for a system, service, or application with the strengths of a relational database. Therefore, techniques that facilitate the creation of a relational database replica of an original non-relational data store may enable use of the various features offered by a relational database.

In some embodiments, a data stream conversion service may generate a relational database to create a replica of the non-relational database. In order to direct the data stream from the non-relational database to a relational database, the database stream conversion service may first initialize a relational database with a schema to accurately replicate and represent the non-relational database. The data stream conversion service may crawl through the data structure and attributes of table models of the non-relational database to determine a representation in the relational database. In some embodiments, a parser of the data stream conversion service may be used to extract the data structure and attributes of the non-relational table models of the selected non-relational database that the data streaming conversion service may use to determine a schema. In some embodiments, multiple schemas may be generated from which the schema is selected to apply to the relational database. In some embodiments, the generated schemas may maintain the mapping between the non-relational database data types and the relational database data types. In some embodiments, the data stream conversion service converts to the same data type or a similar type by serializing the data values. In some embodiments, one or more data streams directed towards the relational database of the data store may be converted into a format able to be handled by the relational database of the OLAP data store.

Once the relational database has been initialized, the data stream conversion service may replicate the data stream for the non-relational database and convert it into changes to be applied to the relational database. In some embodiments, a change log of the stream conversion service may be used to generate the data stream for the relational database in order to avoid impacting the read capacity of the non-relational database and perform the conversion in near real time. In some embodiments, the data stream generated from the change log stream to capture changes happening in non-relational database may occur using an event-based approach. Each event can be processed individually or in batches to transform and then publish the data to the initialized relational database. Various non-relational and relational database may be used as endpoints in the conversion. In some embodiments, the non-relational database may support key-value and document data models. In some embodiments, the relational database may be a standalone database hosted on one computer system (e.g., computer system 900 in FIG. 9) or multiple computer systems in a distributed database system, such as a database (or data processing) cluster. In some embodiments, the conversion of the data stream from a non-relational database to a relational database may be performed in batches and be provided as a stream of batched events. Unknown data types (or data types unable to be interpreted by the relational database), in some embodiments, may be transformed into a string data type or to the original raw format. In some embodiments, the data stream conversion service may determine that events of the event stream have failed to be processed by the relational database and store them in a failed event queue and send a notification of the failed conversion.

FIG. 1A illustrates a logical block diagram illustrating a non-relational to relational database data stream conversion service that parses database attributes of the non-relational database to generate a relational database schema, according to some embodiments. A non-relational to relational database data stream conversion service 102 may include an attribute parser 103 and a relational database schema engine 124. The attribute parser 103 may parse through the non-relational database attributes of the non-relational database 104, retrieve the attributes, and allow the relational database schema engine 124 to generate a relational database schema 126.

The relational database 130, in some embodiments, may access the parsed non-relational attributes that were obtained through the parser, apply one or more rule sets or one or more machine learning algorithms to determine a schema for the relational database 130. The attribute parser 103 may obtain data entries of the non-relational database 130, determine the various attributes, determine the fields of the schema for the relational database replica, and map the attributes to fields, as further discussed in FIGS. 4 and 5. In some embodiments, the non-relational database 130 may be a key-value table featuring items that have attributes, some of which form a primary key. The primary key of an item of the non-relational database may contain a required key for every item along with other attributes that pertain to that item. In some embodiments, primary keys may be scalar (strings, numbers, or binary) and may take one of two forms, a single-attribute primary key known as the "partition key" that determines the partition that an item hashes to attain a partition key has a uniform distribution over its range as well as a second attribute called the "sort key". The partition key may be used to determine which partition the item is stored in, but within each partition, items may be sorted by the sort key. The primary key and sort keys may be used by the non-relational database to facilitate generation of a change log that will may be used to generate an event stream replica of the data stream to the relational database 130.

In various embodiments, the non-relational database 130 may be various other types of non-relational databases and not limited to key-value databases. For example, the relational database schema engine 124 may generate the relational database schema 126 by attribute data parsed from a document database or a graph database. In some embodiments, a document-based database may use documents to store the data in the database in various formats such as JSON, BSON, or XML documents and store and retrieve data in a form that is much closer to the data objects used in applications. The attribute parser 103 may determine the one or more attributes in the documents and determine the relational database schema fields to map to. In some embodiments, collections, or groups of documents that store documents, may have similar contents with similar attributes and the attribute parser 103 may prioritize mapping of the common attributes. Not all the documents in the collection may share similar attributes as document databases may not have a set schema and individual documents may encompass data having unique attributes. In some embodiments, the various data types of the data attributes obtained by the attribute parser 103 may include various types of data, such as integer, real, character, Boolean, array, and tree, that are common across multiple programming languages as well as custom data types. In some embodiments, the customer data types may include tuples or other data structures containing other values in fixed number and in fixed sequence.

Figure 1B:
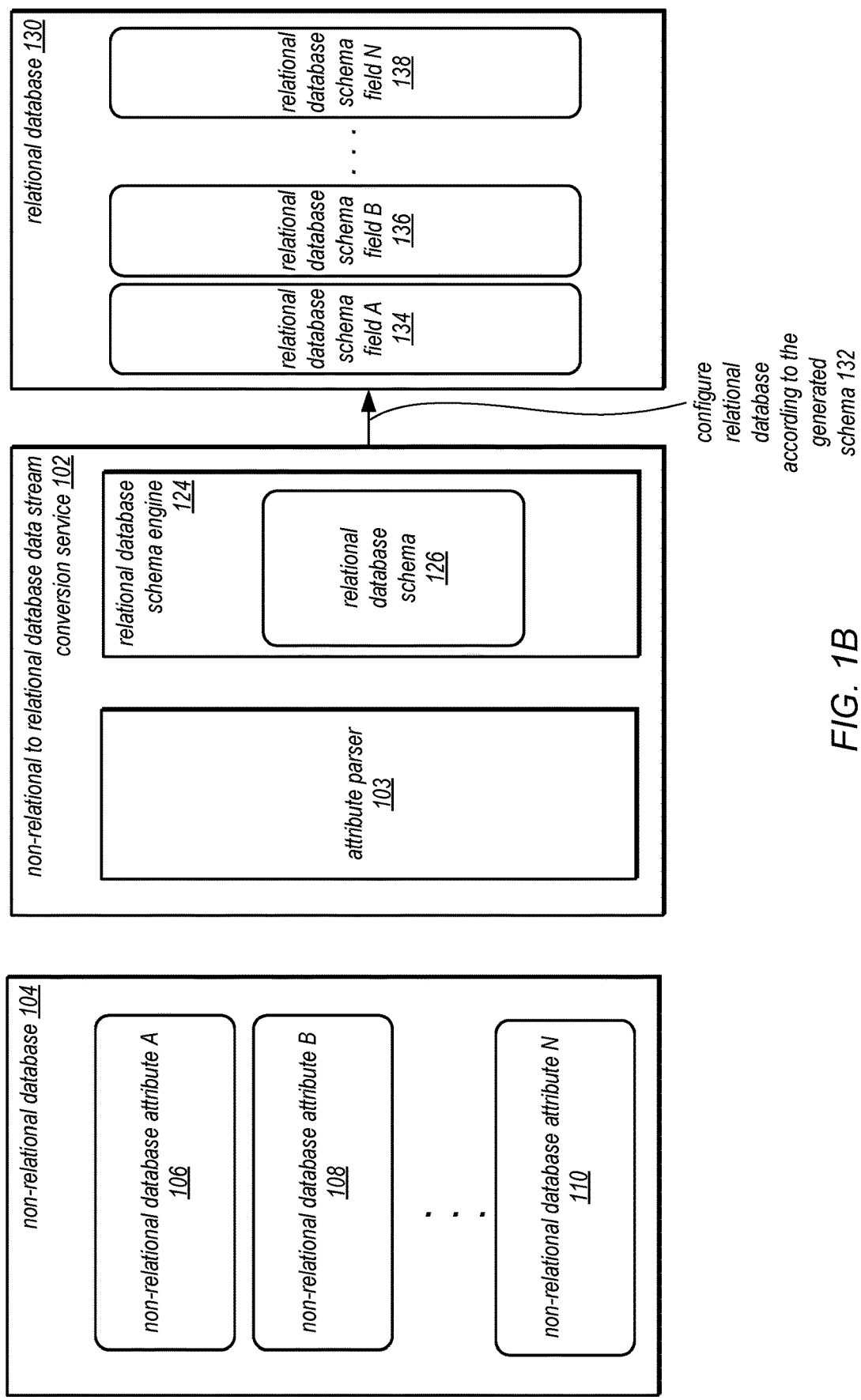
FIG. 1B illustrates a logical block diagram illustrating a non-relational to relational database data stream conversion service configuring the relational database according to the schema generated using the parsed database attributes, according to some embodiments.

FIG. 1B illustrates a logical block diagram illustrating a non-relational to relational database data stream conversion service configuring the relational database according to the schema generated using the parsed database attributes, according to some embodiments.

In some embodiments, once the data stream conversion service has crawled through the data structure and attributes of the various data in the non-relational database to determine the relational database schema 126, the non-relational to relational database data stream conversion service 102 may generate the relational database 130 according to the schema. The relational database 130 may encompass a plurality of relational database schema fields A 134, relational database schema fields B 136, and relational database schema fields N 138 in the relational database 130 that correspond to various attributes in the non-relational database 104. In some embodiments, the non-relational database attribute A 106, the non-relational database attribute B 108, and the non-relational database attribute N 110 may correspond to the relational database schema fields A 134, relational database schema fields B 136, and relational database schema fields N 138 respectively in a one-to-one manner. In some embodiments, the various non-relational database attributes may correspond to one or more of the relational database schema fields. For example, in some embodiments, the non-relational database attribute A 106 may correspond to relational database schema field A 134 and relational database scheme field B 136 as the non-relational database attribute A 106 is deconstructed into two separate fields in the relational database schema 126. Similarly, the data types of the respective non-relational database attributes and respective relational database schema fields may be associated with one another or may require decomposition or conversion into an acceptable data type as discussed in FIG. 4.

In various embodiments, the relational database 130 may include various type of databases that allows identification and access of data in relation to another piece of data in the database. For example, in some embodiments, the relational database 130 may follow a row-oriented storage that support complete data types in a MySQL instance type and support atomicity, consistency, isolation, and durability ("ACID") compliance. In some embodiments, the relational database 130 may use a columnar storage structure and may be optimized for column level processing than complete row level processing and may not support consistency among the ACID properties and exhibit eventual consistency.

In some embodiments, the various relational database schema fields of the relational database 130 may be of various data types, such as integer, real, character, Boolean, array, and tree, as well as custom data types determined by the relational database schema engine 124 as a replica of the non-relational database 104. In some embodiments, the custom data types may be stored as raw data format or other format unable to be processed by the relational database but able to be processed by a downstream application of the relational database. In some embodiments, the relational database schema fields may be a string data type of a data type of non-relational database attribute, including string format of nested data.

Once determined, non-relational to relational database data stream conversion service 102 may configure relational database 130 according to the generated schema, as indicated at 132. For example, non-relational to relational database data stream conversion service 102 may send one or more requests to create one or more tables at relational database 130. As part of these table creation requests, non-relational to relational database data stream conversion service 102 may specify the schema of the table(s), by specifying the number and data types of columns according to relational database schema 126. In some embodiments, various Application Programmatic Interface (API) requests, query language requests (e.g., SQL statements), or various other interfaces or protocols may be used to send the create table(s) table requests, as supported by relational database 130.

Figure 1C:
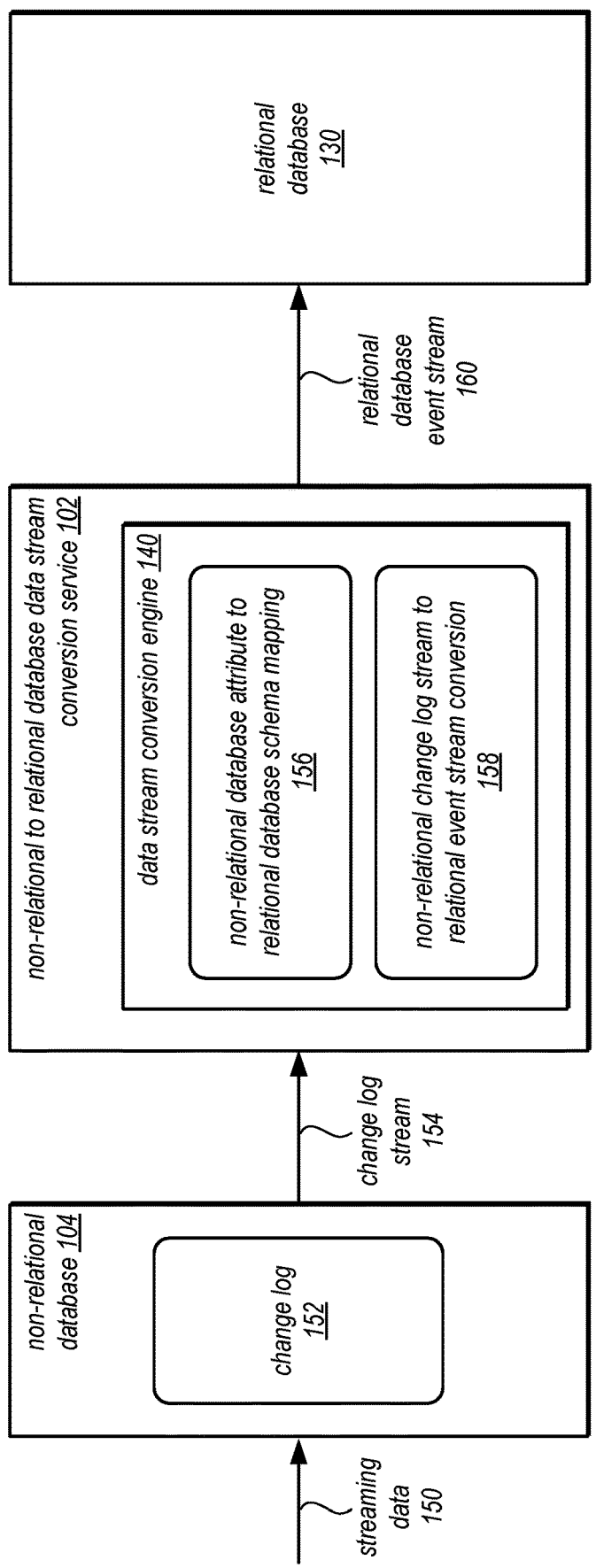
FIG. 1C illustrates a logical block diagram illustrating a non-relational to relational database data stream conversion service converting changes made to the non-relational database as described in a change log stream into a relational database event stream in accordance with the generated schema, according to some embodiments.

FIG. 1C illustrates a logical block diagram illustrating a non-relational to relational database data stream conversion service converting changes made to the non-relational database as described in a change log stream into a relational database event stream in accordance with the generated schema, according to some embodiments.

In some embodiments, the non-relational database 104 may receive a streaming data 150 wherein the streaming data 150 may be an additional data or a request to modify various data of the non-relational database 104. The non-relational database 104 may forward the streaming data 150 and/or generate a change log 152 to provide a change log stream 154 to the non-relational to relational database data stream conversion service 102. The change log 152 may be used to generate the data stream for the relational database in order to avoid impacting the read capacity of the non-relational database 104 and perform the conversion using the data stream conversion engine 140 in near real time.

Once the change log stream 154 and/or the streaming data 150 is provided to the non-relational to relational database data stream conversion service 102, the data stream conversion engine 140 may use the non-relational database attribute to relational database schema mapping 156 from the schema used to configure 132 the relational database 130 to convert the change log stream 154 to relational database event stream 160 that is associated with the change made to the non-relational database. The data stream conversion engine 140 may utilize a non-relational change log stream to relational event stream conversion 158 to make a replica of changes made to the non-relational database 104 to the relational database 130. In some embodiments, a change to one attribute of an item in the non-relational database 104 may affect a plurality of associated relational database 130 fields for the corresponding entry. In some embodiments, the data stream generated from the change log stream to capture changes happening in non-relational database may occur using an event-based approach wherein the changes take the form of various events reflecting that change. Each event can be processed individually or in batches to transform and then publish the data to the initialized relational database 130, as further discussed in FIG. 5.

Please note that the previous description of a non-relational to relational database data stream conversion service 102 is a logical illustration and thus is not to be construed as limiting as to the implementation of databases, system interfaces, or various other features. In some embodiments, a plurality of non-relational databases and relational databases 130 may be used instead of a single non-relational database to a relational database. Different combinations or implementations may be implemented in various embodiments.

This specification continues with a general description of a provider network that implements a data stream conversion service. Then various examples of a data stream conversion service including different components/modules, or arrangements of components/module that may be employed as part of implementing the data stream conversion service are discussed. A number of different methods and techniques to implement various methods of providing released namespaces and controlling the availability of namespaces for new associations then discussed, some of which are illustrated in accompanying flowcharts. Finally, a description of an example computing system upon which the various components, modules, systems, devices, and/or nodes may be implemented is provided. Various examples are provided throughout the specification.

Figure 2:
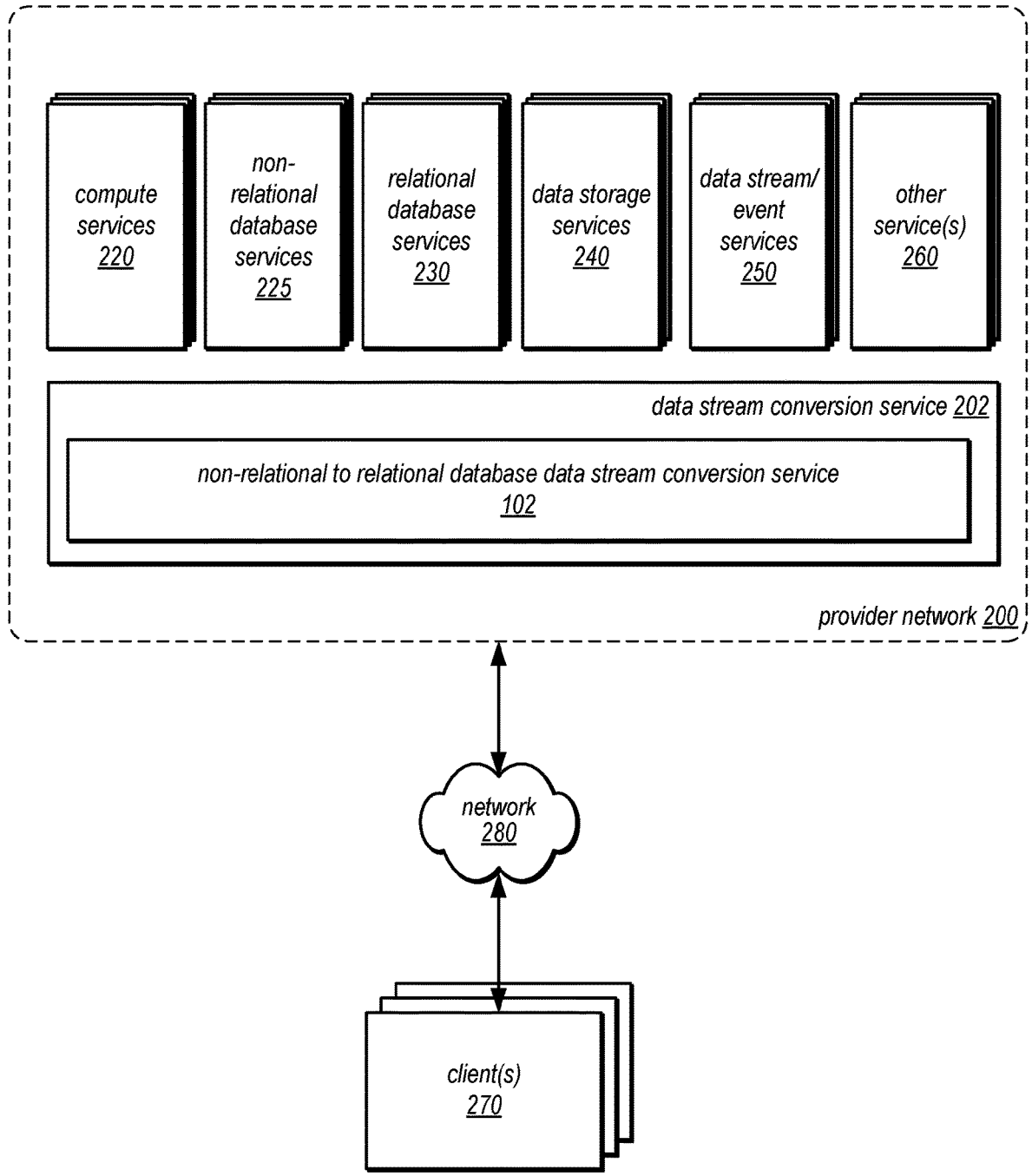
FIG. 2 is a logical block diagram illustrating a provider network offering a data stream conversion service, including non-relational to relational database data stream conversion service, that configures a relational database according to a schema generated using a parsed database attributes of the non-relational database and converts a non-relational data stream into a relational database event stream, according to some embodiments.

FIG. 2 is a logical block diagram illustrating a provider network offering a data stream conversion service, including non-relational to relational database data stream conversion service, that configures a relational database according to a schema generated using a parsed database attributes of the non-relational database and converts a non-relational data stream into a relational database event stream, according to some embodiments. Provider network 200 may be a private or closed system or may be set up by an entity such as a company or a public sector organization to provide one or more services (such as various types of cloud-based storage) accessible via the Internet and/or other networks to clients 270, in some embodiments. Provider network 200 may be implemented in a single location or may include numerous data centers hosting various resource pools, such as collections of physical and/or virtualized computer servers, storage devices, networking equipment and the like (e.g., computing system 900 described below with regard to FIG. 9), needed to implement and distribute the infrastructure and services offered by the provider network 200. In some embodiments, provider network 200 may implement various computing systems, services, resources, or services, such as a data stream conversion service 202, compute services 220, non-relational database services 225, relational database services 230 (e.g., relational database query engines, map reduce processing, data flow processing, and/or other large scale data processing techniques), data storage service(s) 240. (e.g., an object storage service, block-based storage service, or data storage service that may store different types of data for centralized access), data stream and/or event services 250, and other services 260 (any other type of network based services (which may include various other types of storage, processing, analysis, communication, event handling, visualization, and security services not illustrated). In various embodiments, the data stream conversion service 202 may encompass a non-relational to relational database data stream conversion service 102 that configures a relational database according to the schema generated using the parsed database attributes and converts non-relational streaming data into a relational database event stream in accordance with the generated schema, as further discussed in FIGS. 3-5. In some embodiments, the non-relational database and the relational database serving as endpoints of the data stream to be converted may be instantiated via the non-relational database services 225 and relational database services 230 respectively. Furthermore, in some embodiments, the data stream/event services 250 may be used to facilitate the transfer of data converted using the data stream conversion service 202.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

Compute services 220 may be implemented by provider network 200, in some embodiments. Compute services 220 may offer instances, containers, and/or functions according to various configurations for client(s) 270 operation. A virtual compute instance may, for example, encompass one or more servers with a specified computational capacity (which may be specified by indicating the type and number of CPUs, the main memory size, and so on) and a specified software stack (e.g., a particular version of an operating system, which may in turn run on top of a hypervisor). A container may provide a virtual operation system or other operating environment for executing or implementing applications. A function may be implemented as one or more operations that are performed upon request or in response to an event, which may be automatically scaled to provide the appropriate number computing resources to perform the operations in accordance with the number requests or events. A number of different types of computing devices may be used singly or in combination to implement the compute instances, containers, and/or functions and of provider network 200 in different embodiments, including general purpose or special purpose computer servers, storage devices, network devices and the like. In some embodiments, instance client(s) 270 or other any other user may be configured (and/or authorized) to direct network traffic to a compute instance.

Compute instances, containers, and/or functions may operate or implement a variety of different services, such as application server instances, general purpose or special-purpose operating systems, services that support various interpreted or compiled programming languages such as Ruby, Perl, Python, C, C++ and the like, or high-performance computing services) suitable for performing client(s) 270 applications, without for example requiring the client(s) 270 to access an instance. Applications (or other software operated/implemented by a compute instance and may be specified by client(s), such as custom and/or off-the-shelf software. Compute instance configurations may also include compute instances, containers, and/or functions with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, containers, and/or functions, such as a particular number of virtual CPU cores, memory, cache, storage, as well as any other performance characteristic. Configurations of compute instances, containers, and/or functions may also include their location, in a particular data center, availability zone, geographic, location, etc. and (in the case of reserved compute instances, containers, and/or functions) reservation term length.

In some embodiments, non-relational database services 225 may include services that process requests to data that is not stored in fully structured storage (e.g., non-relational or NoSQL databases). In other embodiments, non-relational database services 225 may locally store, managed, and access semi-structured or not-structured data. In some embodiments, non-relational database services 225 may be various types of data processing services to perform different functions (e.g., query or other processing engines to perform functions such as anomaly detection, machine learning, data lookup, or any other type of data processing operation). For example, in at least some embodiments, non-relational database services 225 may include a map reduce service that creates clusters of processing nodes that implement map reduce functionality over data stored in one of data storage services 240. Various other distributed processing architectures and techniques may be implemented by non-relational database services 225 (e.g., grid computing, sharding, distributed hashing, etc.). Note that in some embodiments, data processing operations may be implemented as part of data storage service(s) 240 (e.g., query engines processing requests for specified data).

In various embodiments, relational database services 230 may be various types of data processing services that perform general or specialized data processing functions (e.g., analytics, big data querying, time-series data, graph data, document data, relational data, non-relational data, structured data, semi-structured data, unstructured data, or any other type of data processing operation) over data that is stored across multiple storage locations, in some embodiments. For example, in at least some embodiments, relational database services 230 may include various types of database services for storing, querying, and updating data. Such services may be enterprise-class database systems that are scalable and extensible. Queries may be directed to a database in relational database services 230 that is distributed across multiple physical resources, as discussed below, and the database system may be scaled up or down on an as needed basis, in some embodiments. The database system may work effectively with database schemas of various types and/or organizations, in different embodiments. In some embodiments, clients/subscribers may submit queries or other requests (e.g., requests to add data) in a number of ways, e.g., interactively via an SQL interface to the database system or via Application Programming Interfaces (APIs). In other embodiments, external applications and programs may submit queries using Open Database Connectivity (ODBC) and/or Java Database Connectivity (JDBC) driver interfaces to the database system.

Data storage service(s) 240 may implement different types of data stores for storing, accessing, and managing data on behalf of clients 270 as a network-based service that enables clients 270 to operate a data storage system in a cloud or network computing environment. For example, one data storage service 240 may be implemented as a centralized data store so that other data storage services may access data stored in the centralized data store for processing and or storing within the other data storage services, in some embodiments. Such a data storage service 240 may be implemented as an object-based data store, and may provide storage and access to various kinds of object or file data stores for putting, updating, and getting various types, sizes, or collections of data objects or files. Such data storage service(s) 240 may be accessed via programmatic interfaces (e.g., APIs) or graphical user interfaces. A data storage service 240 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In various embodiments, data stream and/or event services 250 may provide resources to ingest, buffer, and process streaming data in real-time. In some embodiments, data stream and/or event services 250 may act as an event bus or other communications/notifications for event driven systems or services (e.g., events that occur on provider network 200 services and/or on-premise systems or applications). The data stream/event services 250 may ingest, buffer, and process streaming data directed to a non-relational database and/or process event stream directed to the relational database.

Generally speaking, clients 270 may encompass any type of client configurable to submit network-based requests to provider network 200 via network 280, including requests for release monitoring service management service 210 (e.g., a request to create a release monitoring service from different data sources of the other provider services and identify one or more as a target data source). For example, a given client 270 may include a suitable version of a web browser, or may include a plug-in module or other type of code module that may execute as an extension to or within an execution environment provided by a web browser. Alternatively, a client 270 may encompass an application such as a database application (or user interface thereof), a media application, an office application or any other application that may make use of resources in in provider network 200 to implement various features, systems, or applications. (e.g., to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application may interact directly with provider network 200. In some embodiments, client 270 may generate network-based services requests according to a Representational State Transfer (REST)-style network-based services architecture, a document- or message-based network-based services architecture, or another suitable network-based services architecture.

In some embodiments, a client 270 may provide access to provider network 200 to other applications in a manner that is transparent to those applications. For example, client 270 may integrate with an operating system or file system to provide storage on one of data storage service(s) 240 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 240 may be coordinated by client 270 and the operating system or file system on behalf of applications executing within the operating system environment.

Clients 270 may convey network-based services requests (e.g., request to replicate data stream from the non-relational database to the relational database) to and receive responses from provider network 200 via network 280. In various embodiments, network 280 may encompass any suitable combination of networking hardware and protocols necessary to establish network-based-based communications between clients 270 and provider network 200. For example, network 280 may generally encompass the various telecommunications networks and service providers that collectively implement the Internet. Network 280 may also include private networks such as local area networks (LANs) or wide area networks (WANs) as well as public or private wireless networks. For example, both a given client 270 and provider network 200 may be respectively provisioned within enterprises having their own internal networks. In such an embodiment, network 280 may include the hardware (e.g., modems, routers, switches, load balancers, proxy servers, etc.) and software (e.g., protocol stacks, accounting software, firewall/security software, etc.) necessary to establish a networking link between given client 270 and the Internet as well as between the Internet and provider network 200. It is noted that in some embodiments, clients 270 may communicate with provider network 200 using a private network rather than the public Internet.

Figure 3:
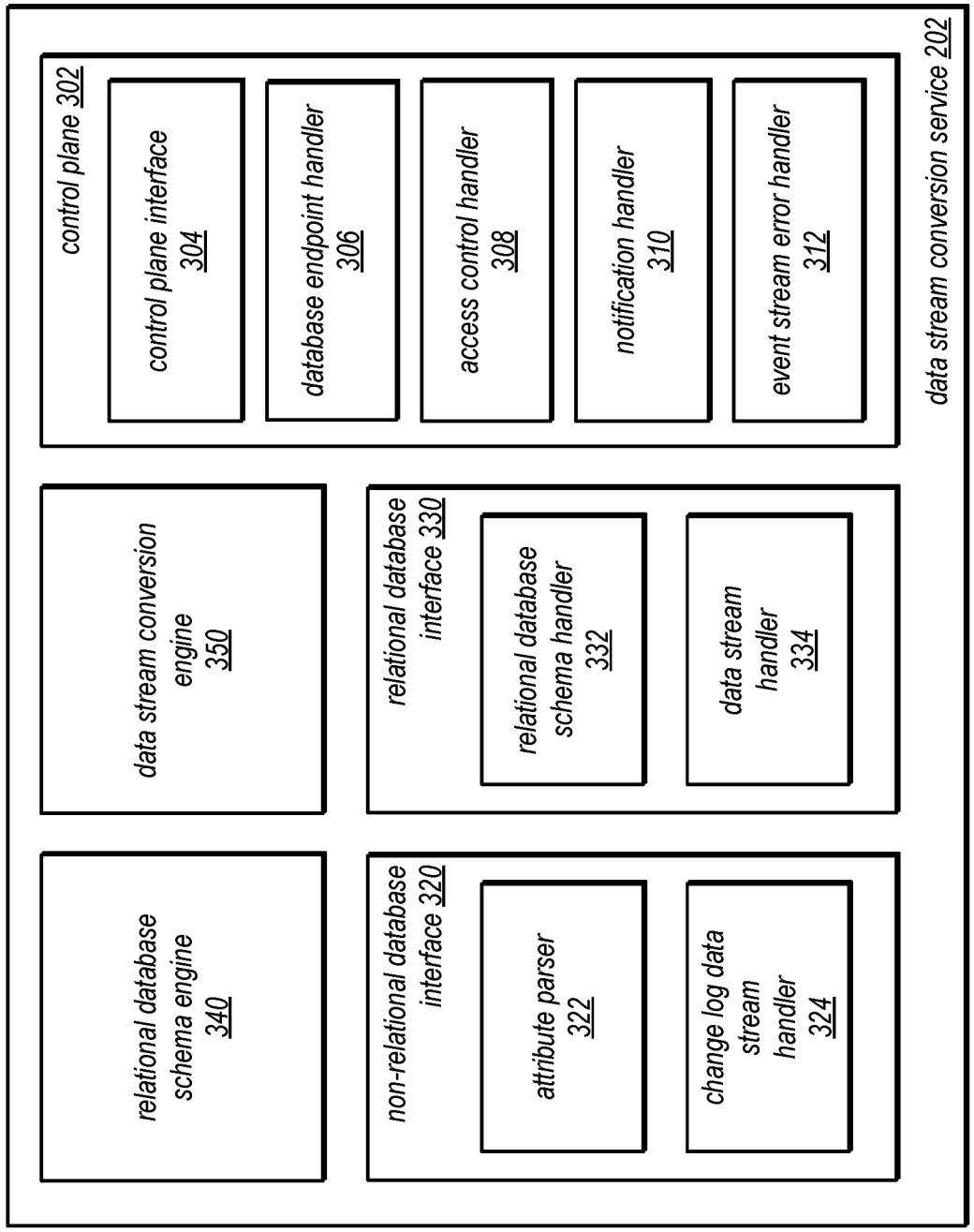
FIG. 3 is a logical block diagram illustrating a data stream conversion service and various components that that configures a relational database according to the schema generated using the parsed database attributes and converts non-relational streaming data into a relational database event stream in accordance with the generated schema, according to some embodiments.

FIG. 3 is a logical block diagram illustrating a data stream conversion service and various components that that configures a relational database according to the schema generated using the parsed database attributes and converts non-relational streaming data into a relational database event stream in accordance with the generated schema, according to some embodiments.

In some embodiments, data stream conversion service 204 may encompass a control plane 302. The control plane interface 304 may allow users to interact with the control plane through various communication protocols including various API requests. The database endpoint handler 306 may configure a non-relational database interface 320 to identify the correct relational database to replicate and obtain a data stream to convert into an event stream for a relational database. Additionally, the database endpoint handler may configure the relational database interface to a correct endpoint in which to generate a relational database. In some embodiments, the endpoints may be a non-relational database provided by the non-relational database service 225 and/or a relational database provided by the relational database service 230.

In some embodiments, an access control handler 308 may be configured to determine whether a request made to the data stream conversion service 202 (e.g., requesting the data stream conversion service 202 to perform conversion of data stream from one endpoint with a non-relational database to a destination endpoint for a relational database). The access control handler 308 may process credentials required for HTTP authentication using username and password sent alongside an API call to the data stream conversion service 202, key authentication using unique keys disclosed to authorized users of the data stream conversion service 202, using OAuth authorization framework, or other types of credentials. In some embodiments, the access credentials of the subscription request may result in a lookup on a username, username password, role, or other identity. Unauthorized requests with improper access credentials may be denied, and may be notified of the denial of permissions using a notification handler 310. In some embodiments, the notification handler 310 may be configured to send notification of various events, including denial of permissions as determined by the access control handler 308, encounter of an event stream error as determined by an event stream error handler 312. The even stream error handler 312 may in some embodiments, be configured to store in a data store, records of failures in the conversion process from a failure to generate an event stream from a change log, an encounter with an unknown data type, or other errors in the generation of streaming of events.

In some embodiments, the non-relational database interface 320 may include an attribute parser 322 and a change log data stream handler 324. The attribute parser may use used to crawl through the various data items in the non-relational database determined by the database endpoint handler 306 and obtain data structures of the non-relational database including the various data attributes of the non-relational database. The change log stream handler 324 may be used to receive the changes made to the non-relational database. In some embodiments, the relational database interface 330 may include a relational database schema handler 332 and a data stream handler 334. Relational database schema engine 340 may generate a schema for the relational database as determined in the database endpoint handler 306, as described in FIG. 1A and FIG. 4. The relational database schema handler 332 may provide option to choose one or more schemas generated by the relational database schema engine 340 and receive inputs regarding the schema generation. A data stream conversion engine 350 may utilize the change log data stream received by the change log data stream handler 324 and convert the change log into associated event stream that would reflect that change. The data stream handler 334 may stream the event to the relational database as determined by the database endpoint handler 306.

Figure 4:
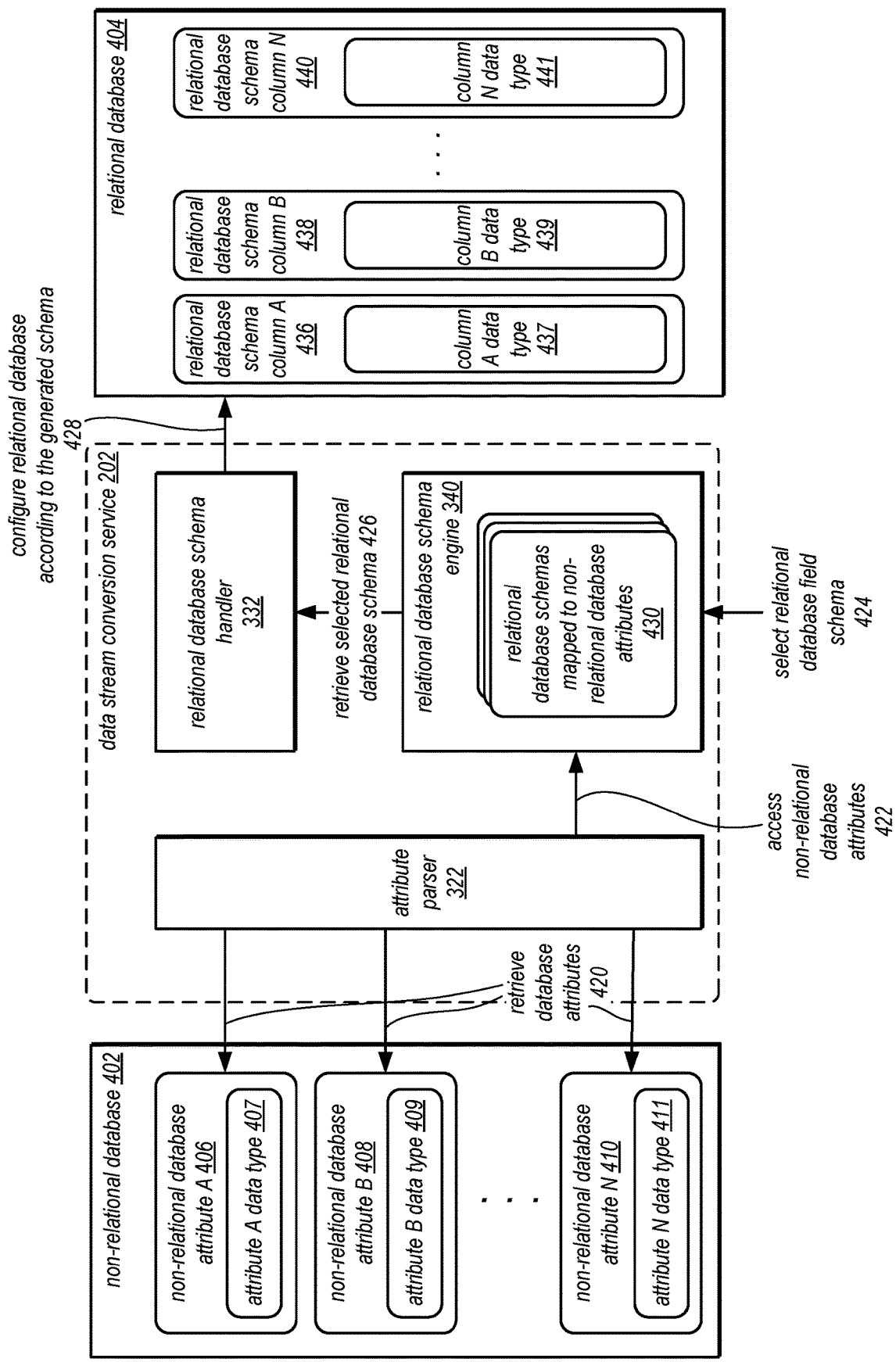
FIG. 4 is logical block diagram illustrating interactions supported by an example relational database schema engine of a data stream conversion service to generate relational database schemas mapped to non-relational database attributes and to configure relational database according to the generated schema, according to some embodiments.

FIG. 4 is logical block diagram illustrating interactions supported by an example relational database schema engine of a data stream conversion service to generate relational database schemas mapped to non-relational database attributes and to configure relational database according to the generated schema, according to some embodiments. In some embodiments, a data stream conversion service 202 may include the attribute parser 322, the relational database schema engine 340, and the relational database schema handler. The attribute parser 322 may parse through the non-relational database attributes of a non-relational database 402 to crawl through the data inside the non-relational database to obtain the various non-relational database attributes, including their respective data types. As discussed in FIGS. 1A and 1B, the non-relational database 402 may be a key-value table featuring items that have attributes, some of which form a primary key for every item along with other attributes that pertain to that item. The non-relational database 402 may be various other types of non-relational databases and not limited to key-value databases. For example, the non-relational database 402 may be a document-based database may use documents to store the data in the database in various formats such as JSON, BSON, or XML documents.

In some embodiments, the attribute parser 322 may retrieve database attributes 420 by crawling through the various data in the non-relational database, extracting information regarding the structure of that data, and identifying the database attributes including the data types of the respective extracted attributes. In some embodiments, the attribute parser 322 may not crawl through all data but obtain information from select portions of the non-relational database 402. Once the attribute parser 322 has crawled through the data structure of the data items and obtained various attributes of the data of the non-relational table 402, the relational database schema engine 340 may access the non-relational database attributes 422 that was obtained to generate one or more relational database schemas mapped to non-relational database attributes 430. The relational database schema engine 340 in some embodiments, may apply one or more rules sets or one or more algorithms to determine a schema for a relational database 404 to stream data to. In some embodiments, the rule sets may indicate attribute having a certain data type to be mapped to a schema column having the same data type, or in another embodiment, be mapped to a predetermined data type. In some embodiments, machine learning (ML) models may be trained to determine the relational database schemas 430 that maps to non-relational database attributes based on past history of determined mappings. The relational database schema engine 340 may generate multiple relational database schemas and allow users to select relational database field schema 424 from various options generated. In some embodiments, the data stream conversion service 202 may also allow users to individually give inputs to decide how to map certain non-relational database attributes to relational database schema columns as well as what data types the schema columns will have.

Once the relational database schema is determined and/or selected, the relational database schema handler 332 retrieves the selected relational database schema 426 and configures the relational database 404 according to the generated schema 428. The location of the relational database 404 may be determined by the database endpoint handler 306. In some embodiments, the relational database 404 may include a plurality of relational database schema column A 436, relational database schema column B 438, and relational database schema column N 440 that respectively have a column A data type 437, column B data type 439, and column C data type 441. The various columns of the relational database 404 may correspond to various attributes in the non-relational database 402. In some embodiments, a non-relational database attribute A 406 having attribute A data type 407 may be mapped to the relational database schema column A 436, a non-relational database attribute B 408 having attribute B data type 409 may be mapped to the relational database schema column B 438, and a non-relational database attribute N 410 having attribute N data type 411 may be mapped to the relational database schema column A 440. In some embodiments, the attributes from the non-relational database 402 may be mapped to relational database schema columns of the relational database 404 respectively in a one-to-one manner. In some embodiments, the various non-relational database attributes may correspond to one or more of the relational database schema fields. For example, in some embodiments, a single non-relational database attribute A 406 may correspond to relational database schema column A 436 and relational database scheme column B 438. The one-to-many mapping may occur, in some embodiments, as a result of the non-relational database attribute deconstructed into two separate fields in the relational database schema 126. In some embodiments, multiple non-relational database attributes may be combined or processed into a single schema column in the relational database 404. The data types of the respective non-relational database attributes and respective relational database schema fields may be associated with one another as determined by the relational database schemas. For example, attribute A data type 407 may be mapped to column A data type 437 in the case that the non-relational database attribute A 406 and relational database schema column A 436 are mapped with one another. In some embodiments, the mapping between the data types of the non-relational database and a relational database may require decomposition or conversion into an acceptable data type.

Please note that the previous description of the data stream conversion service 202 is a logical illustration and thus is not to be construed as limiting as to the implementation of databases, system interfaces, or various other features. For example, although FIG. 4 depicts relational database 404 and the non-relational database 402 as having three columns and attributes, there may be any number of columns and attributes having variety of structures. Different combinations or implementations may be implemented in various embodiments.

Figure 5:
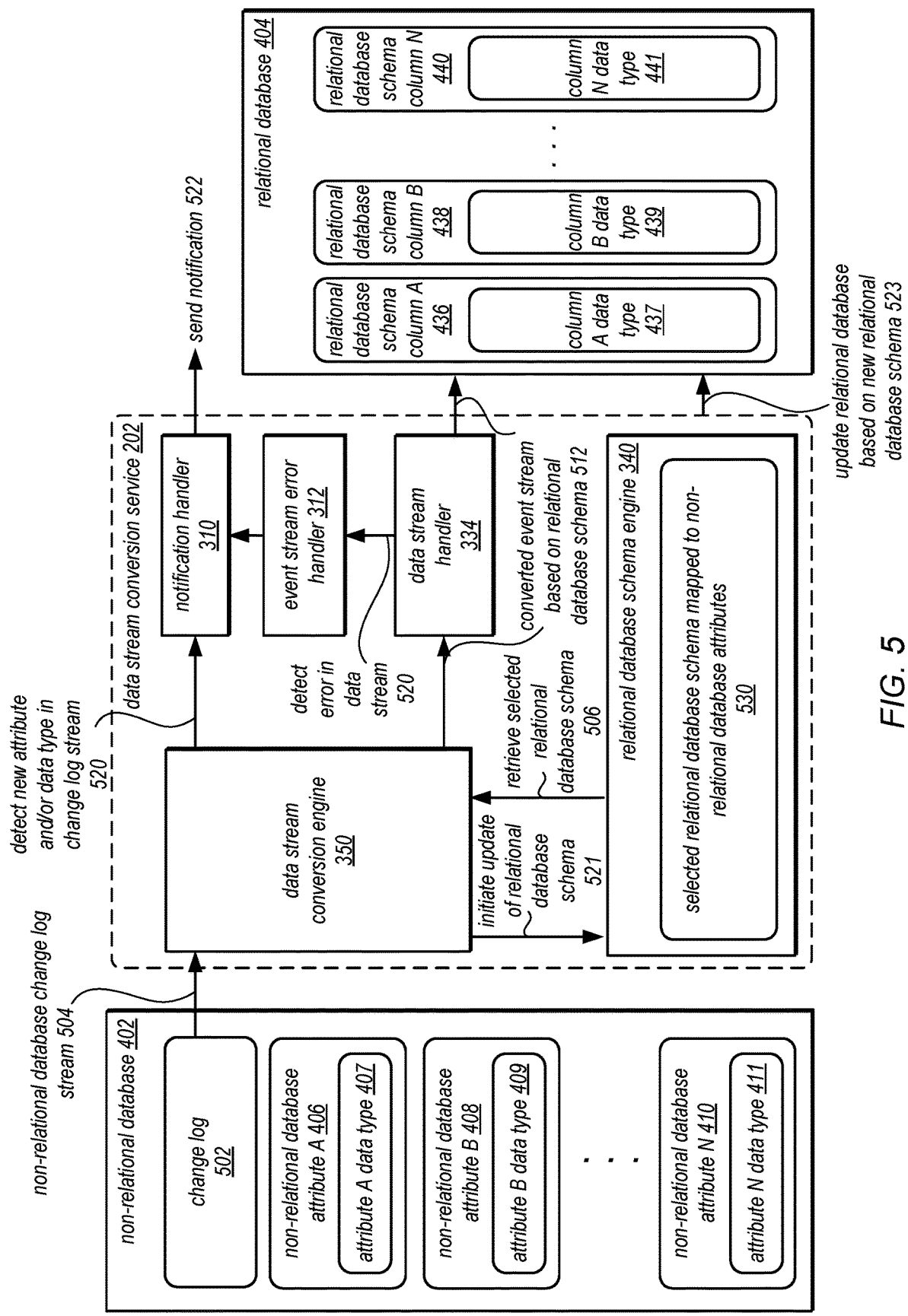
FIG. 5 is logical block diagram illustrating interactions supported by an example data stream conversion engine of a data stream conversion service to convert non-relational database change log stream into a relational database event stream in accordance with a selected relational database schema, according to some embodiments.

FIG. 5 is logical block diagram illustrating interactions supported by an example data stream conversion engine of a data stream conversion service to convert non-relational database change log stream into a relational database event stream in accordance with a selected relational database schema, according to some embodiments.

In some embodiments, the non-relational database 402 may receive a streaming data from one or more sources wherein the streaming data may be additional data or request to modify various data of the non-relational database. The non-relational database 402 may generate a change log 502 based on streaming data directed towards the non-relational database 402. The change log 502 may be used to record and reflect the data streamed to the non-relational database 402 as changes or operations made to the non-relational database 402. The change log 502 may be used to generate the data stream for the relational database and avoid impacting the read capacity of the non-relational database 402 and allow the stream to be converted and applied to the relational database near real time. The non-relational database change log stream 504 may be provided to the data stream conversion engine 350 to generate a converted event stream based on the relational database schema 512. In some embodiments, the data stream conversion engine 350 retrieves the selected relational database schema 506 from the relational database schema engine 340. The relational database schema engine 340 may provide a selected relational database schema mapped to non-relational database attribute 530 based on the selection by the user of one of the schema options, as described in FIG. 4.

The data stream conversion engine 350 may apply one or more transformations to a change made to the non-relational database 402 according to the relational database schema and generate an event stream that may be applied to the relational database 404. For example, a change made to a data item regarding a value of a non-relational database attribute A 406 may be changed to an event to populate a data item under the relational database schema column A 436, in the case that attribute A 406 and column A 436 are mapped together. In some embodiments, the conversion may also include conversion in the data types from attribute A data type to data type of column A. Once the transformation has been applied, the converted event stream based on the relational database schema 512 is sent by the data stream handler 332 to the relational database 404 to be applied. In some embodiments, the data stream handler 334 may publish the event to the relational database 404 in batches or individually. In some embodiments, an event stream error handler 312 may detect errors in the data stream 520 or may receive errors, such as errors in application of the event returned by the relational database 404 to resolve the detected errors. In some embodiments, the errors may be sent to one or more data stores and may be resolved in the future. In some embodiments, the notification handler may send notification of error in the data stream 522. In some embodiments, the data stream conversion engine 350 may detect a new attribute and/or data type in the change log stream 520. The data stream conversion engine 350 may send the detected one of the new attributes and/or data types in the change log stream of the non-relational database 402 to the notification handler 310. The notification handler 310 may send a notification 522 of the detection of the new attribute and/or data type in the change log stream that were not mapped previously in the relational database schema. In some embodiments, the data stream conversion engine 350 may initiate update the relational database schema 521 upon detection of new attribute and/or data type in the change log stream 520. The relational database schema engine 340 may generate a new relational database schema mapped to the non-relational database attributes that includes the new attribute and/or data type. In some embodiments, the relational database schema engine 340 may update of the relational database based on the new relational database schema 523. For example, the data stream conversion service 202 may send one or more requests to add one or more columns to the relational database 404 to accommodate the newly detected non-relational database attribute.

Figure 6:
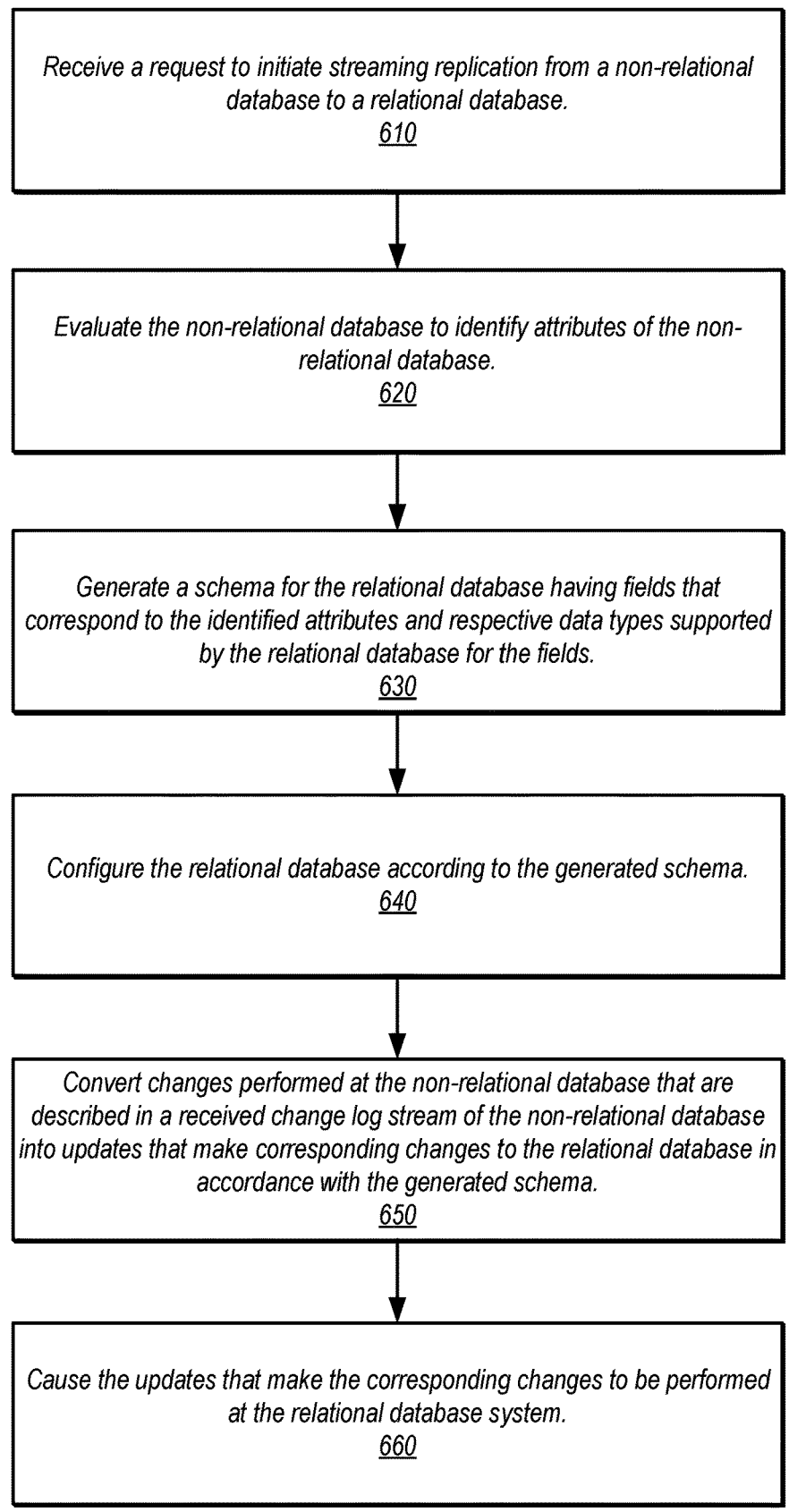
FIG. 6 is a high-level flowchart illustrating various methods and techniques to implement a data stream conversion service used to enable streaming from a non-relational database to a relational database, according to some embodiments.

Although FIGS. 2-5 have been described and illustrated in the context of a provider network implementing a data stream conversion service, the various components illustrated and described in FIGS. 2-5 may be easily applied to other systems that enable replication between non-relational and relational databases. As such, FIGS. 2-5 are not intended to be limiting as to other embodiments of a system that may enable streaming from a non-relational database to a relational database. FIG. 6 is a high-level flowchart illustrating various methods and techniques to implement a data stream conversion service used to enable streaming from a non-relational database to a relational database, according to some embodiments.

Various systems and devices may implement the various methods and techniques described below, either singly or working together. For example, a data stream conversion service such as described above with regard to FIGS. 2-5 or a non-relational to relational database data stream conversion service as discussed above with regard to FIG. 1 may implement the various methods. Alternatively, a combination of different systems and devices may implement these methods. Therefore, the above examples and or any other systems or devices referenced as performing the illustrated method, are not intended to be limiting as to other different components, modules, systems, or configurations of systems and devices.

FIG. 6 is a high-level flowchart illustrating various methods and techniques to implement a data stream conversion service used to enable streaming from a non-relational database to a relational database, according to some embodiments.

As indicated at 610, a request to initiate streaming replication from a non-relational database to a relational database may be received. As described in FIG. 3, in some embodiments, a data stream conversion service may receive the request to initiate streaming replication from the non-relational database to the relational database. In some embodiments, a database endpoint handler of the data stream conversion service may configure a non-relational database interface to receive the request to initiate streaming replication and identify the correct relational database to replicate to based on endpoints specified in the request. The data stream conversion service may, in some embodiments, obtain a data stream from the non-relational database to convert into an event stream for a relational database.

As indicated at 620, at least a portion of the non-relational database may be evaluated to replicate a data stream, wherein the evaluating identifies one or more attributes of the non-relational database. In some embodiments, the attributes of the non-relational database that is evaluated may be associated with a first respective data typesupported by the non-relational database. In some embodiments, the non-relational database may be evaluated to determine a key-value table featuring items that have attributes, some of which form a primary key for every item along with other attributes that pertain to that item. In some embodiments, the non-relational database may be various other types of non-relational databases and not limited to key-value databases. For example, the non-relational database evaluated may be a document-based database may use documents to store the data in the database in various formats such as JSON, BSON, or XML documents having various attributes supported by the aforementioned formats.

As indicated at 630, a schema for the relational database may be generated. As described in FIG. 4, the schema may include one or more fields that correspond to an identified attribute and respective data types supported by the relational database for the one or more fields that correspond to another data type of the non-relational database. Furthermore, in some embodiments, ML models may be trained to determine the relational database schemas that maps to non-relational database attributes based on past history of determined mappings as described in FIG. 4.

As indicated at 640, the relational database may be configured according to the generated schema. For example, the relational database may include a plurality of relational database schema columns respectively having data types. The various columns of the relational database may correspond to various attributes in the non-relational database that were evaluated previously. In some embodiments, the attributes from the non-relational database may be mapped to relational database schema columns of the relational database respectively in a one-to-one manner. In some embodiments, the various non-relational database attributes may correspond to one or more of the relational database schema fields. The one-to-many mapping may occur, in some embodiments, as a result of the non-relational database attribute deconstructed into two separate fields in the relational database schema. Various types of relational databases may be configured, including row-oriented storage and support complete data types in a MySQL instance type as well as support atomicity, consistency, isolation, and durability ("ACID") compliance. In some embodiments, the relational database may use a columnar storage structure and may be optimized for column level processing.

As indicated at 650, changes performed at the non-relational database that are described in a received change log stream of the non-relational database may be converted into updates that make corresponding changes to the relational database in accordance with the generated schema.

As indicated at 650, updates that make the corresponding changes to be performed at the relational database system may be caused. As described in FIG. 5, in some embodiments, the updates may be sent as batched updates.

Figure 7:
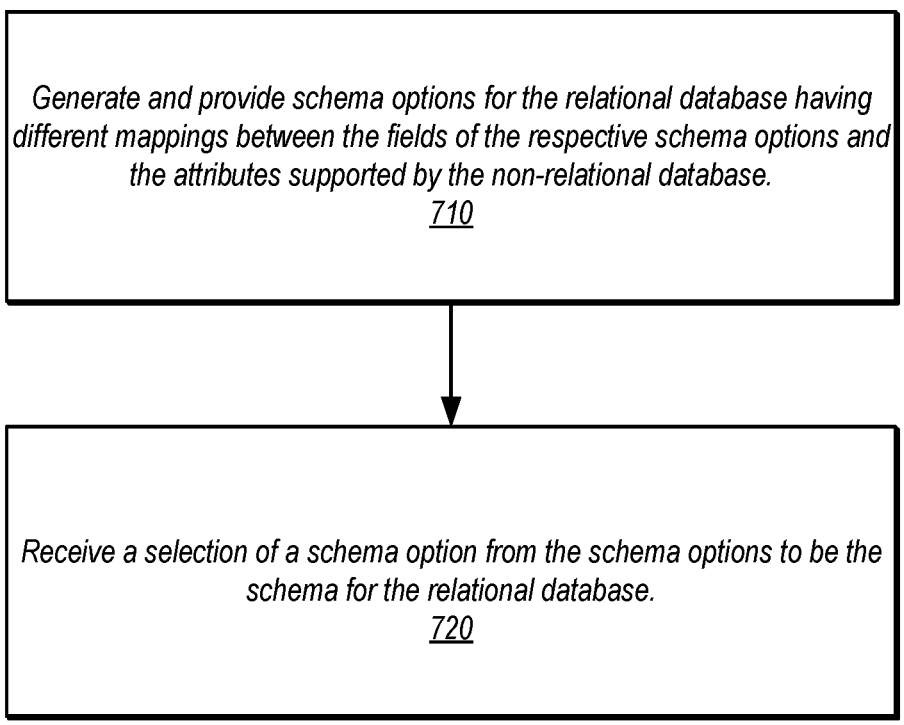
FIG. 7 is a high-level flowchart illustrating various methods and techniques to implement a data stream conversion service to select a schema for a relational database from a plurality of schema options, according to some embodiments.

FIG. 7 is a high-level flowchart illustrating various methods and techniques to implement a data stream conversion service to select a schema for a relational database from multiple schema options, according to some embodiments.

As indicated at 710, multiple schema options may be generated for the relational database having different mappings between the one or more fields of the respective schema options and the respective ones of the attributes supported by the non-relational database. Then, the schema options may be provided via an interface of the database conversion service. In some embodiments, the data stream conversion service may allow users to individually give inputs to decide how to map certain non-relational database attributes to relational database schema columns as well as what data types the schema columns will have. For example, a data stream conversion service may provide a graphical user interface that allows users to map identified attributes with possible data types from the generated schema operations. In some embodiments, the graphical user interface may present users options to override data types assigned to columns of the relational database with a user identified data type to associate with a data attribute.

As indicated at 720, selection of a schema option from the plurality of schema options may be received (e.g., via an interface of the database conversion service) to be the schema for the relational database as further described in FIG. 4. In some embodiments, the data stream conversion service may provide a graphical user interface that allows users to send to the data stream conversion service the schema selection. The schema selected may be used to instantiate a relational database and may receive streamed data as described in FIGS. 4 and 5.

Figure 8:
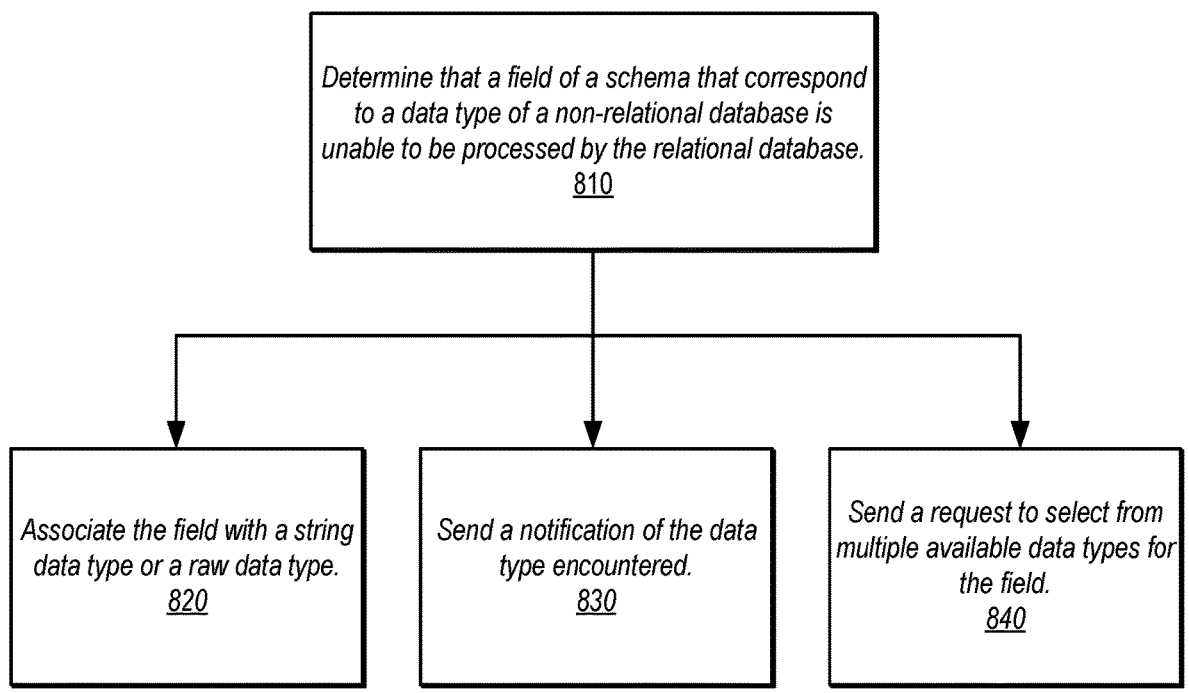
FIG. 8 is a high-level flowchart illustrating various methods and techniques to implement a data stream conversion service configured to respond to a data type unable to be processed by a relational database, according to some embodiments.

FIG. 8 is a high-level flowchart illustrating various methods and techniques to implement a data stream conversion service configured to respond to a data type unable to be processed by a relational database, according to some embodiments.

As indicated at 810, a field of the schema that correspond to the data type of the non-relational database may be determined as unable to be processed by the relational database. For example, the unsupported data type may be a data type not supported by some relational database such as IMAGE data type or globally unique identifier (GUID) data type. In some embodiments, the data type that is unable to be processed by the relational database may be a custom data types including aggregate data types or other data structures containing multiple data types.

As indicated at 820, the field may be associated a string data or a raw data type. As discussed in FIG. 5, in some embodiments, based on an encounter with a data type unable to be interpreted by the relational database, the data stream conversion service may be transformed into a string data type or to the original raw format.

As indicated at 830, a notification of the encountered data type unable to be processed may be sent. As discussed in FIG. 5, in some embodiments, based on an encounter with a data type unable to be interpreted by the relational database, the data stream conversion service may determine that events of the event stream have failed to be processed by the relational database and store them in a failed event queue and send a notification of the failed conversion.

As indicated at 840, request to select from multiple available data types for the field may be sent. In some embodiments, the data stream conversion service may generate one or more data type options for the schema field and send a request to select from the generated options. In some embodiments, the multiple available data types may be determined based on a ML models may be trained to determine the relational database schema as discussed in FIG. 4.

Figure 9:
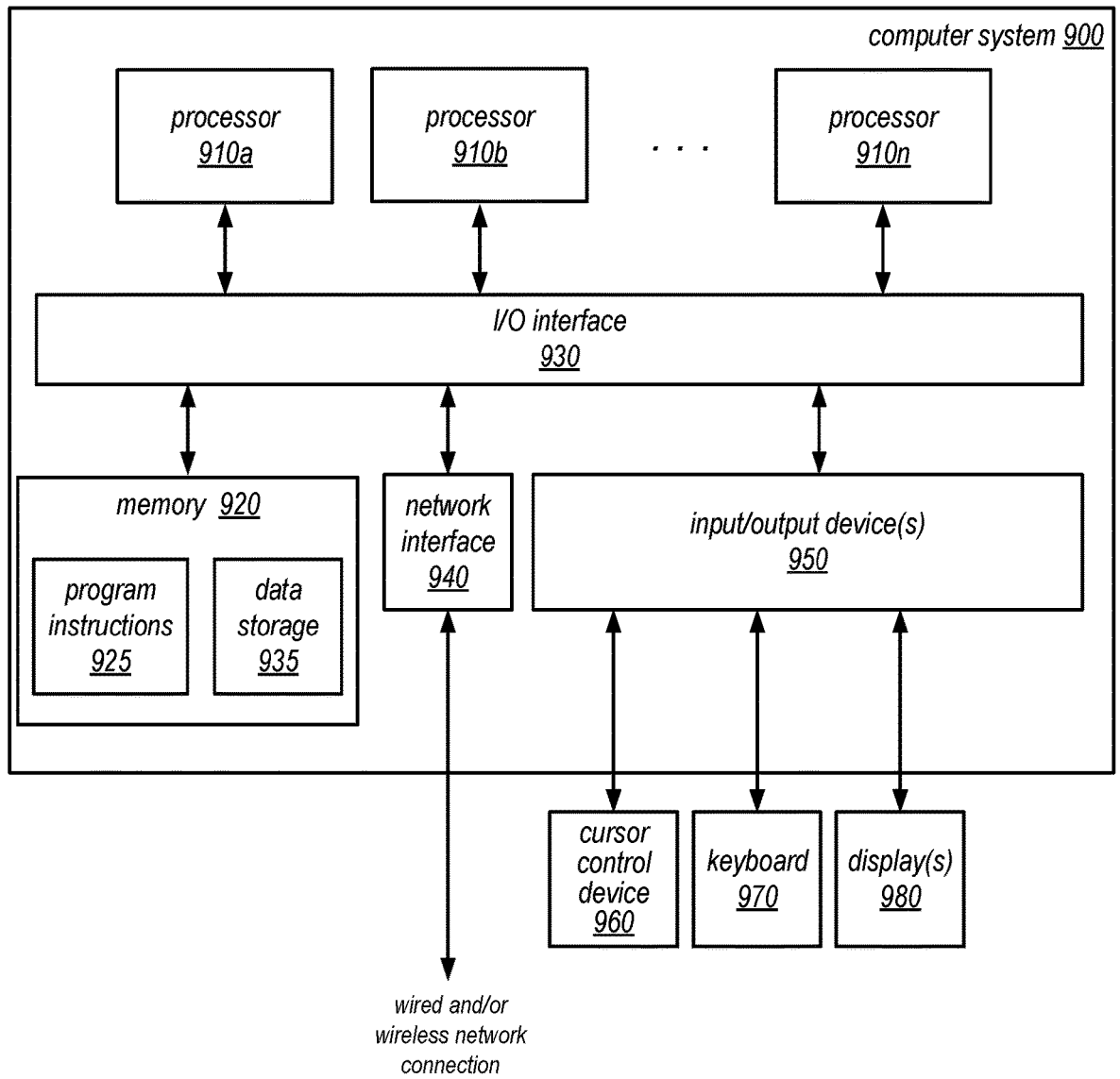
FIG. 9 illustrates an example system configured to implement the various methods, techniques, and systems described herein, according to some embodiments.

Embodiments of data stream conversion service and various components that monitors and manages release of namespaces. One such computer system is illustrated by FIG. 9. In different embodiments, computer system 900 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, computing system compute system, or electronic device.

In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. Display(s) 980 may include standard computer monitor(s) and/or other display systems, technologies or devices. In at least some implementations, the input/output devices 950 may also include a touch- or multi-touch enabled device such as a pad or tablet via which a user enters input via a stylus-type device and/or one or more digits. In some embodiments, it is contemplated that embodiments may be implemented using a single instance of computer system 900, while in other embodiments multiple such systems, or multiple nodes making up computer system 900, may host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

In some embodiments, at least one processor 910 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s).

System memory 920 may store program instructions and/or data accessible by processor 910. In various embodiments, system memory 920 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 920 as program instructions 925 and data storage 935, respectively. In other embodiments, program instructions and/or data may be received, sent or stored upon different types of computer-accessible media or on similar media separate from system memory 920 or computer system 900. Generally speaking, a non-transitory, computer-readable storage medium may include storage media or memory media such as magnetic or optical media, e.g., disk or CD/DVD-ROM coupled to computer system 900 via I/O interface 930. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 940.

In one embodiment, I/O interface 930 may coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. In addition, in some embodiments, some or all of the functionality of I/O interface 930, such as an interface to system memory 920, may be incorporated directly into processor 910.

Network interface 940 may allow data to be exchanged between computer system 900 and other devices attached to a network, such as other computer systems, or between nodes of computer system 900. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or retrieving data by one or more computer system 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

As shown in FIG. 9, memory 920 may include program instructions 925, may implement the various methods and techniques as described herein, and data storage 935, comprising various data accessible by program instructions 925. In one embodiment, program instructions 925 may include software elements of embodiments as described herein and as illustrated in the Figures. Data storage 935 may include data that may be used in embodiments. In other embodiments, other or different software elements and data may be included.

Those skilled in the art will appreciate that computer system 900 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 900 may also be connected to other devices that are not illustrated, or instead may operate as a stand-alone system. In addition, the functionality provided by the illustrated components may in some embodiments, be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
one or more computing devices, respectively comprising at least one processor and a memory that implement a data stream conversion service, configured to:
receive a request to initiate streaming replication from a non-relational database to a relational database;
evaluate at least a portion of the non-relational database, wherein the evaluation identifies one or more attributes of the non-relational database, wherein the one or more attributes are associated with first respective data types of the one or more attributes supported by the non-relational database;
generate a schema for the relational database, wherein the schema comprises:
one or more fields that correspond to respective ones of the identified one or more attributes; and
second respective data types supported by the relational database for the one or more fields that correspond to the first respective data types of the identified one or more attributes supported by the non-relational database;
replicate the streaming data from the non-relational database to the relational database, wherein to replicate, the data stream conversion service is configured to:
create one or more tables at the relational database according to the generated schema;
receive a change log stream for the non-relational database, wherein the change log stream describes changes performed at the non-relational database;
convert the changes performed at the non-relational database that are described in the received change log stream of the non-relational database into an update stream comprising updates to be made for the relational database in accordance with the generated schema; and
make, based on the update stream, corresponding changes to the one or more tables at the relational database in accordance with the generated schema.

2. The system of claim 1, wherein to generate the schema, the data stream conversion service is configured to:
generate a plurality of schema options for the relational database having different mappings between the one or more fields of the respective schema options and the respective ones of the attributes supported by the non-relational database;
provide the plurality of schema options via an interface of the data stream conversion service; and
receive a selection of a schema option from the plurality of schema options via the interface of the data stream conversion service to be the schema for the relational database.

3. The system of claim 1, wherein the non-relational database is a key-value database, and wherein the attributes supported by the non-relational database are attributes of one or more items of the key-value database.

4. The system of claim 1, wherein, to replicate, the data stream conversion service is further configured to insert the updates into an event stream supported by the relational database to cause the updates that make the corresponding changes to the one or more tables at the relational database in accordance with the generated schema to be performed at the relational database.

5. A method, comprising:
receiving a request to initiate streaming replication from a non-relational database to a relational database;
evaluating at least a portion of the non-relational database, wherein the evaluating identifies one or more attributes of the non-relational database, wherein the one or more attributes are associated with first respective data types of the one or more attributes supported by the non-relational database;
generating a schema for the relational database, wherein the schema comprises:
one or more fields that correspond to respective ones of the identified one or more attributes; and
second respective data types supported by the relational database for the one or more fields that correspond to the first respective data types of the identified one or more attributes supported by the non-relational database; and
performing streaming replication from the non-relational database to the relational database, comprising:
creating one or more tables at the relational database according to the generated schema;
receiving a change log stream for the non-relational database, wherein the change log stream describes changes performed at the non-relational database;
converting the changes performed at the non-relational database that are described in the received change log stream of the non-relational database into an update stream comprising updates to be made for the relational database in accordance with the generated schema; and making, based on the update stream, corresponding changes to the one or more tables at the relational database in accordance with the generated schema.

6. The method of claim 5, wherein generating the schema comprises:

generating a plurality of schema options for the relational database having different mappings between the one or more fields of the respective schema options and the respective ones of the attributes supported by the non-relational database;

providing the plurality of schema options via an interface; and receiving, via the interface, a selection of a schema option from the plurality of schema options to be the schema for the relational database.

7. The method of claim 5, wherein the non-relational database is a key-value database, and wherein the attributes supported by the non-relational database are attributes of one or more items of the key-value database.

8. The method of claim 5, wherein performing streaming replication from the non-relational database to the relational database further comprises inserting the updates into an event stream supported by the relational database to cause the updates that make the corresponding changes to be performed at the relational database.

9. The method of claim 5, wherein the changes performed at the non-relational database are batched, and wherein performing streaming replication from the non-relational database to the relational database further comprises causing the updates that make the batched changes to be performed at the relational database.

10. The method of claim 5, wherein the method further comprises:

determining that one or more fields that correspond to the first respective data types are not able to be processed by the relational database; and based on the determination, selecting second respective data types supported by the relational database for the one or more fields that correspond to the first respective data types of the identified one or more attributes supported by the non-relational database as a string data type or as a raw data format.

11. The method of claim 5, wherein the method further comprises:

determining that one or more fields that correspond to the first respective data types are not able to be processed by the relational database; and based on the determination that the fields that correspond to the first respective data types are not able to be processed by the relational database, sending a notification of the first respective data types are not able to be processed by the relational database.

12. The method of claim 5, wherein the method further comprises:

determining that one or more fields that correspond to the first respective data types are not able to be processed by the relational database; and on the determination that the fields that correspond to the first respective data types are not able to be processed by the relational database, sending a request to select from multiple available data types for the field.

13. The method of claim 5, wherein the method further comprises:

determining one or more failed events of that failed to be processed by the relational database while performing streaming replication and storing them in a failed event queue; and sending a notification subsequent of the one or more failed events.

14. One or more non-transitory, computer-readable storage media, storing program instructions that when executed on or across one or more computing devices cause the one or more computing devices to implement a data stream conversion service that implements:

receiving a request to initiate streaming replication from a non-relational database to a relational database;

evaluating at least a portion of the non-relational database, wherein the evaluating identifies one or more attributes of the non-relational database, wherein the one or more attributes are associated with first respective data types of the one or more attributes supported by the non-relational database;

generating a schema for the relational database, wherein the schema comprises:

one or more fields that correspond to respective ones of the identified one or more attributes; and second respective data types supported by the relational database for the one or more fields that correspond to the first respective data types of the identified one or more attributes supported by the non-relational database; and performing streaming replication from the non-relational database to the relational database, comprising:

creating one or more tables at the relational database according to the generated schema;

receiving a change log stream for the non-relational database, wherein the change log stream describes changes performed at the non-relational database;

converting the changes performed at the non-relational database that are described in the received change log stream of the non-relational database into an update stream comprising updates to be made for the relational database in accordance with the generated schema; and making, based on the update stream, corresponding changes to the one or more tables at the relational database in accordance with the generated schema.

15. The one or more non-transitory, computer-readable storage media of claim 14, wherein, in generating the schema, the program instructions cause the data stream conversion service to implement:

generating a plurality of schema options for the relational database having different mappings between the one or more fields of the respective schema options and the respective ones of the attributes supported by the non-relational database;

providing the plurality of schema options via an interface; and receiving, via the interface, a selection of a schema option from the plurality of schema options to be the schema for the relational database.

16. The one or more non-transitory, computer-readable storage media of claim 14, wherein the non-relational database is a key-value database, and wherein the attributes supported by the non-relational database are attributes of one or more items of the key-value database.

17. The one or more non-transitory, computer-readable storage media of claim 14, wherein the changes performed at the non-relational database is batched, and wherein, in performing streaming replication from the non-relational database to the relational database, the program instructions cause the data stream service to implement inserting the updates into an event stream supported by the relational database to cause the updates that make the corresponding changes to be performed at the relational database.

18. The one or more non-transitory, computer-readable storage media of claim 14, storing further instructions that when executed on or across the one or more computing devices cause the data stream conversion service to further implement:
  - determining that one or more fields that correspond to the first respective data types are not able to be processed by the relational database; and
  - based on the determination, selecting second respective data types supported by the relational database for the one or more fields that correspond to the first respective data types of the identified one or more attributes supported by the non-relational database as a string data type or as a raw data format.

19. The one or more non-transitory, computer-readable storage media of claim 14, storing further instructions that when executed on or across the one or more computing devices cause the data stream conversion service to further implement:
  - determining that one or more fields that correspond to the first respective data types are not able to be processed by the relational database; and
  - based on the determination that the fields that correspond to the first respective data types are not able to be processed by the relational database, sending a notification of the first respective data types are not able to be processed by the relational database.

20. The one or more non-transitory, computer-readable storage media of claim 14, storing further instructions that when executed on or across the one or more computing devices cause the data stream conversion service to further implement:
  - determining that one or more fields that correspond to the first respective data types are not able to be processed by the relational database; and
  - on the determination that the fields that correspond to the first respective data types are not able to be processed by the relational database, sending a request to select from multiple available data types for the field.

\* \* \* \* \*